United States Patent
Greenlaw et al.

[11] Patent Number: 5,915,913
[45] Date of Patent: *Jun. 29, 1999

[54] DELIVERY VEHICLE WITH ELEVATOR ASSEMBLIES FOR MULTI-TIER STORAGE OF CARGO

[76] Inventors: Robert J. Greenlaw, 9209 Stagecoach, Houston, Tex. 77041; Todd M. Greenlaw, 11818 Deep Woods, Cypress, Tex. 77429

[*] Notice: This patent issued on a continued prosecution application filed under 37 CFR 1.53(d), and is subject to the twenty year patent term provisions of 35 U.S.C. 154(a)(2).

[21] Appl. No.: 08/475,950

[22] Filed: Jun. 7, 1995

[51] Int. Cl.$^6$ .................................................. B65G 69/60
[52] U.S. Cl. ........................... 414/679; 414/495; 187/267
[58] Field of Search .................................... 187/267, 414, 187/409; 414/495, 529, 679; 410/26, 28, 28.1, 29.1; 182/249; 296/98

[56] References Cited

U.S. PATENT DOCUMENTS

| | | |
|---|---|---|
| 1,297,619 | 3/1919 | Wessman . |
| 1,931,237 | 10/1933 | O'Connell ............................ 187/409 X |
| 2,611,640 | 9/1952 | Francis ................................ 410/29.1 X |
| 2,832,636 | 4/1958 | Black . |
| 3,051,335 | 8/1962 | Bartlett . |
| 3,119,350 | 1/1964 | Bellingher . |
| 3,368,704 | 2/1968 | Pope . |
| 4,015,686 | 4/1977 | Bushnell, Jr. . |
| 4,139,109 | 2/1979 | Murphy . |
| 4,627,784 | 12/1986 | Collins . |
| 4,642,018 | 2/1987 | Leroux et al. . |
| 4,668,142 | 5/1987 | Fity et al. ........................... 410/29.1 X |
| 4,701,086 | 10/1987 | Thorndyke . |
| 5,036,951 | 8/1991 | Frangos ............................... 187/267 X |
| 5,092,721 | 3/1992 | Prince . |
| 5,096,216 | 3/1992 | McCalla . |
| 5,207,333 | 5/1993 | Peng ..................................... 414/495 X |
| 5,443,350 | 8/1995 | Wilson .................................... 414/495 |
| 5,466,030 | 11/1995 | Harris et al. .............................. 296/98 |
| 5,505,581 | 4/1996 | Gearin et al. ......................... 410/26 X |
| 5,685,228 | 11/1997 | Ehrlich et al. ........................ 410/26 X |

FOREIGN PATENT DOCUMENTS

| | | | |
|---|---|---|---|
| 196924 | 10/1986 | European Pat. Off. .............. | 410/29.1 |
| 1353904 | 1/1964 | France ................................... | 414/529 |
| 155037 | 7/1986 | Japan .................................... | 414/495 |
| 1119958 | 10/1984 | U.S.S.R. ............................... | 187/249 |
| 8800538 | 1/1988 | WIPO .................................... | 414/495 |
| 9400337 | 2/1994 | WIPO .................................... | 414/495 |

OTHER PUBLICATIONS

The Last Leg, Casper, Carol, Jun. 1993, p. 64, 66.

*Primary Examiner*—Boris Milef
*Attorney, Agent, or Firm*—Akin, Gump, Strauss, Hauer & Feld, L.L.P.

[57] ABSTRACT

A cargo delivery vehicle is described having storage for multiple tiers, or levels, of cargo. The delivery vehicle includes one or more elevator assemblies, each of which includes two cargo storage platforms movable so that cargo can be loaded on both platforms from a height corresponding to the upper storage tier and unloaded from both platforms from a height corresponding to the lower storage tier. The elevator assemblies are provided with stabilizing guide rails along which the cargo platforms are raised and lowered. The guide rails of each elevator assembly are spaced so as to allow loading and unloading of cargo from the front, rear, or either side of the vehicle. To minimize loading of the floor and side walls of the delivery vehicle, the elevator assemblies and their cargo are suspended from a deep center truss extending along the length of the delivery vehicle, permitting the weight of the cargo to be borne directly by the vehicle's axles so that non-structural panels, including cargo access doors and insulating panels, can be used in the side walls and floor of the delivery vehicle.

47 Claims, 10 Drawing Sheets

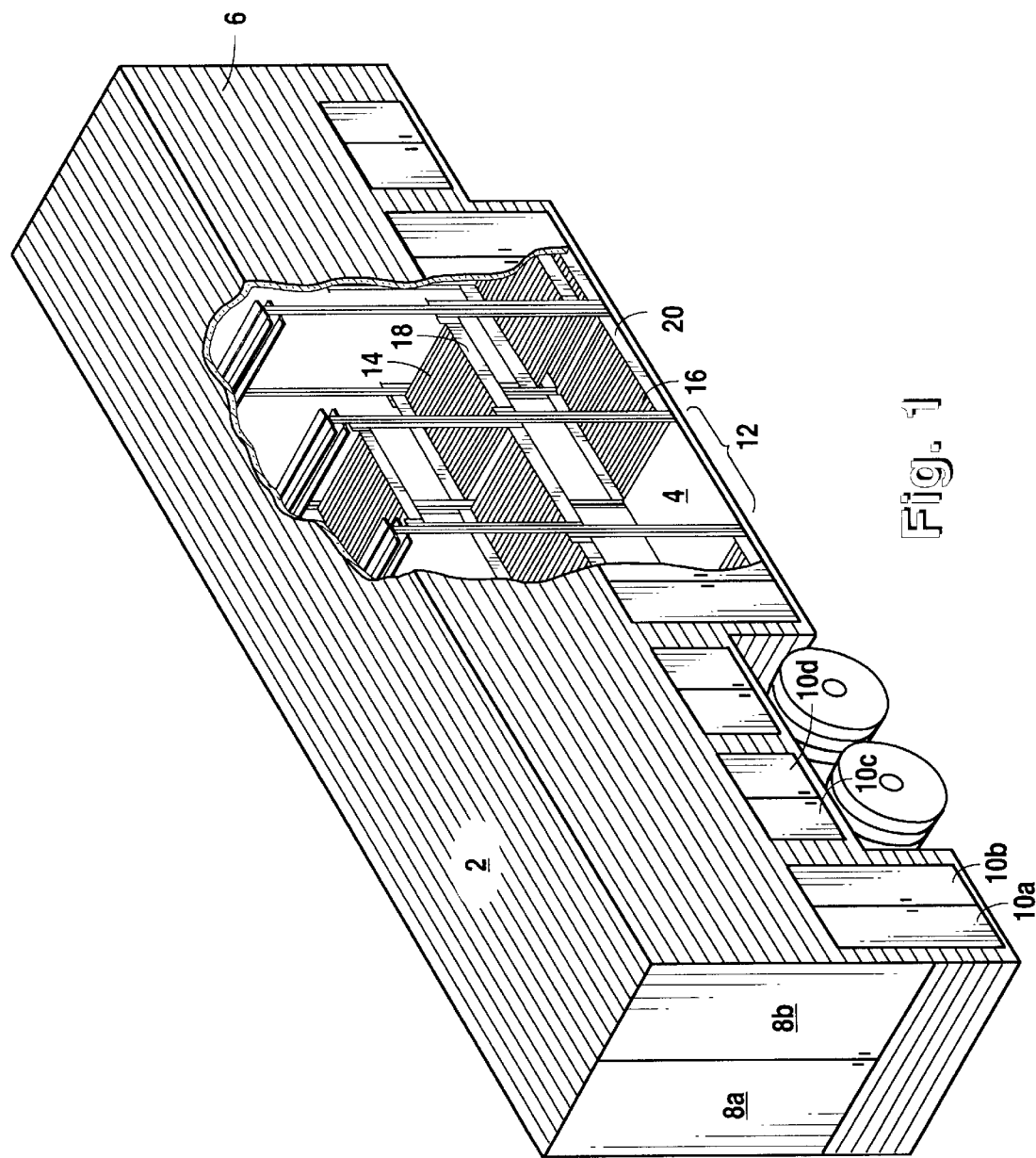

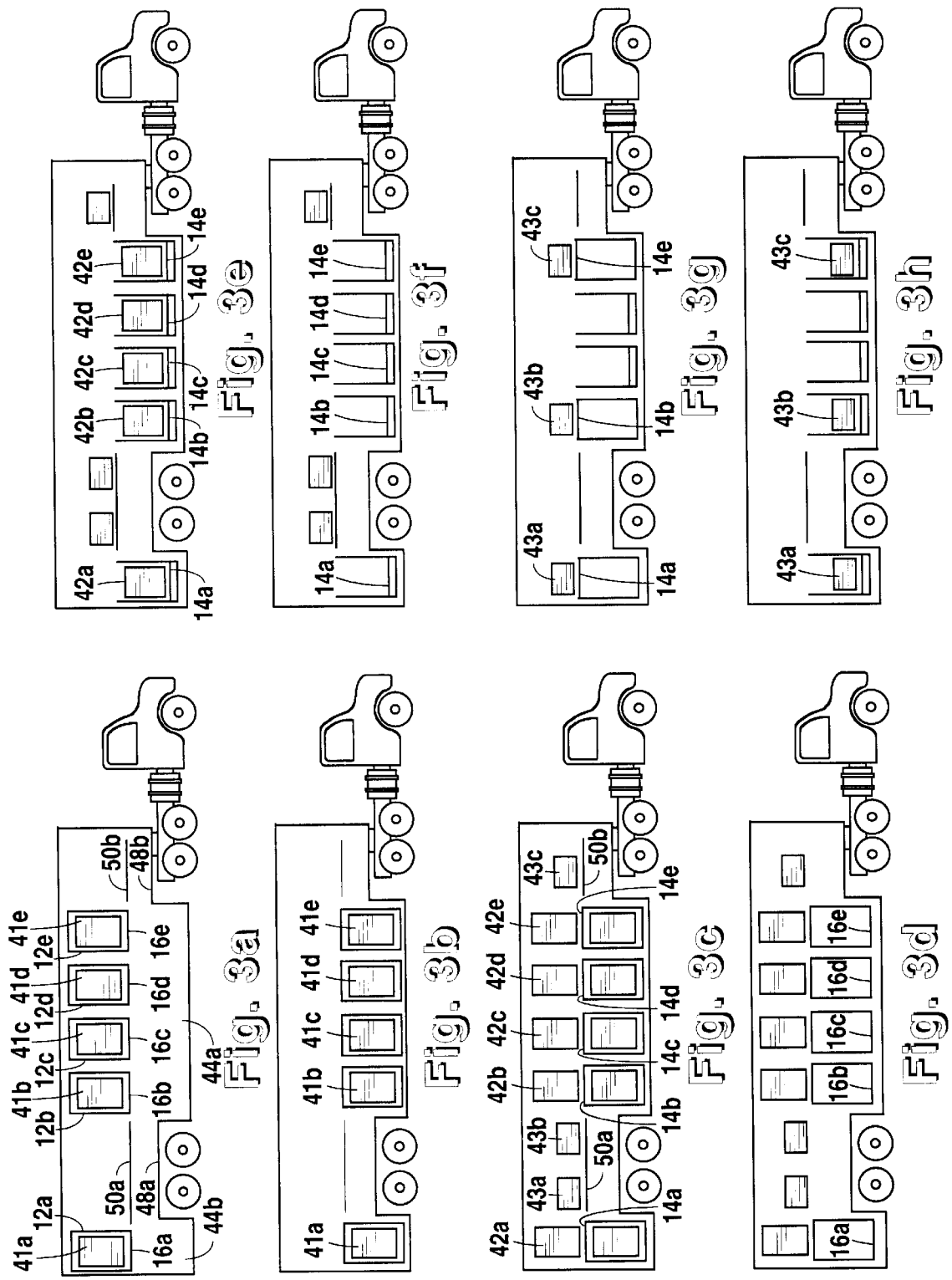

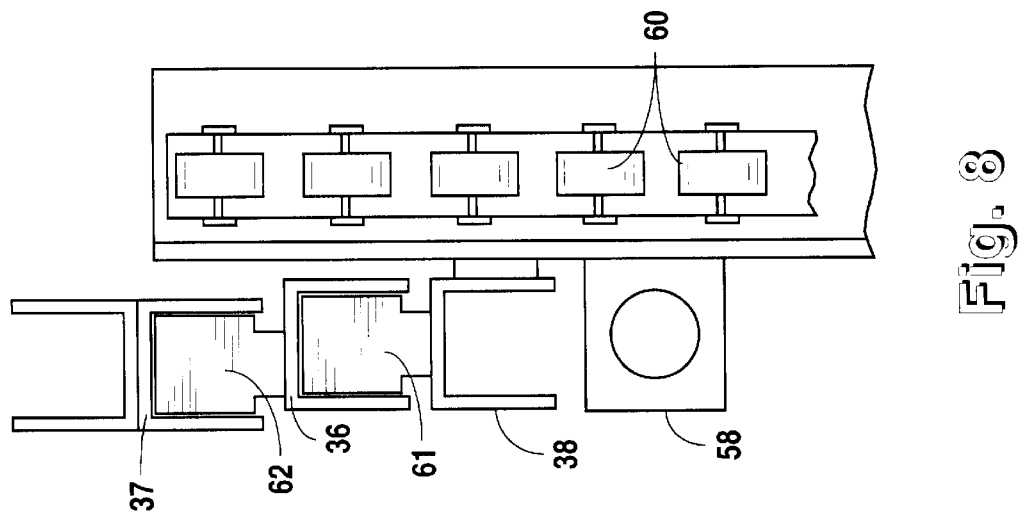
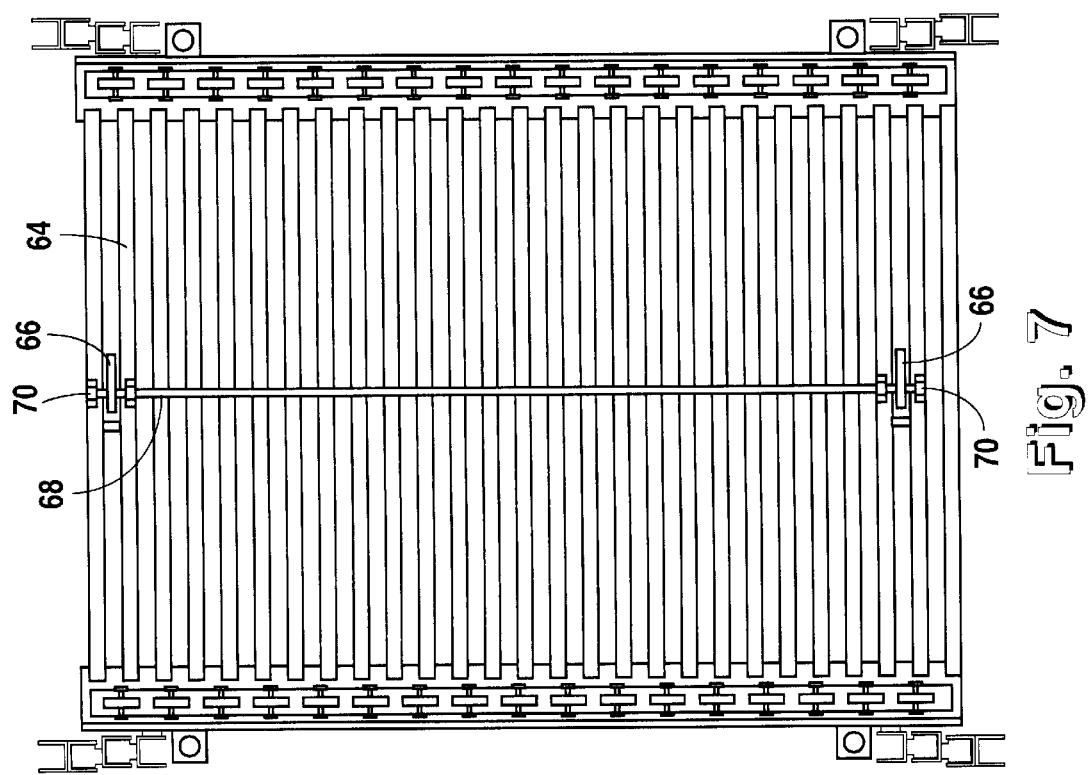

DELIVERY VEHICLE WITH ELEVATOR ASSEMBLIES FOR MULTI-TIER STORAGE OF CARGO

BACKGROUND OF THE INVENTION

The invention relates to cargo delivery vehicles. More particularly the invention relates to cargo delivery vehicles having multiple tiers of cargo storage which can be easily accessed from either street level or a raised-level dock.

It is desirable to store and transport a wide variety of cargo in vehicles having multiple storage tiers so that the most efficient use of the interior space in the vehicle can be made. In modern double drop trailers, the dropped areas fore and aft of the trailer axles may provide 12 feet or more of vertical storage space, offering the opportunity to transport two tiers of palletized cargo, each tier conventionally being approximately six feet in height.

When multi-tier storage is permitted by the interior height of the vehicle and the height of the cargo to be stored, the loading and unloading of the cargo present special problems. It is known to provide upper and lower fixed storage platforms in the vehicle, as described in U.S. Pat. No. 4,139,109 issued Feb. 13, 1989 to Murphy. With such an arrangement, loading and unloading cargo from ground level onto the lowermost storage platform is easily accomplished by the use of ramps, etc. However, loading the upper platforms may require mechanisms for lifting the cargo, such as a forklift or elevator. These may be external to and separate from the vehicle, or they may be designed to fold up inside the vehicle when not in use, as shown by Murphy. Conversely, if loading and unloading is to be performed from raised loading docks, it may be impractical to make use of the lowermost storage tier. Other disadvantages of such a system are that external lifts are cumbersome and exposed to the elements, and internal lift mechanisms take up valuable space which could otherwise be used for cargo storage. Regardless of whether these lift mechanisms are internal or external to the vehicle, the forward cargo is inaccessible while the aft cargo is in place.

A variety of specialized interior elevator arrangements have been developed to overcome the disadvantages of exterior lift mechanisms for multi-tier storage. For example, U.S. Pat. No. 2,832,636 issued Apr. 29, 1958 to Black, discloses the use of a single interior elevator platform extending the length of the cargo storage space, which enables the transportation of cargo in two tiers. Segmented platforms formed by multiple adjoining elevators have also been proposed, such as in U.S. Pat. No. 4,701,086 issued Oct. 20, 1987 to Thorndyke. These segmented platforms provide two-tier storage in certain segments and single-tier storage in other segments where tall cargo is to be stored.

But these vehicles with interior elevators suffer from the disadvantage that loading and unloading must both be performed at the lowermost level in order to achieve full utilization of the storage capacity. In many industries, the nature of the cargo delivery system requires that cargo be loaded at one level, or height, and unloaded from a different level, or height. In traditional transportation schemes, cargo is to be shipped between warehouses, affording the opportunity to both load and unload cargo from ground level at the point of origin and the destination, or at raised loading docks at both the origin and the destination. But modern distribution systems frequently require the transportation of cargo from a warehouse to the consumer's door. Examples are the express package delivery industry and the beverage and food service industries, both of which may permit loading from a raised warehouse loading dock, but require the vehicle's driver or his assistant to unload portions of cargo at the street level for delivery to individual customers at various points along the delivery route. Conversely, in industries such as the collection of recyclable materials, it would be desirable to load cargo portions at street level at various pick-up sites and unload the cargo all at once at a raised dock. Therefore, it is desirable to have a multi-tier delivery vehicle which can be fully loaded at one tier and fully unloaded at another tier. The single-plafform interior elevator assemblies disclosed by Black and Thorndyke do not offer this capability.

Furthermore, in these modern distribution systems just described, it is also desirable to load delivery vehicles from the rear at conventional dock height and unload cargo from the side of the delivery vehicle. Rather than a single destination for all of the cargo stored in the vehicle, there are often multiple destinations corresponding to various customers. Moreover, these varied distribution points typically lack loading docks, forklifts, or other facilities affording easy access to cargo positioned at conventional dock height. Instead, for reasons of safety and efficiency, it is highly desirable to eliminate the need for ramps and ladders by providing direct access to the cargo areas from curbside. To complete the delivery route, it may become necessary to unload all of the cargo from all storage tiers from the side of the vehicle.

But conventional enclosed delivery vehicles may not afford significant side access due to the structural requirements placed on the side walls of the trailer. In conventional enclosed trailers having single-tier or multi-tier storage, the floor is typically required to bear the weight of the cargo and transfer those forces via the side walls to the vehicle's axles. The requirement for numerous, regularly spaced structural members in the side walls may limit the availability of sizable doors for cargo access from the side of the vehicle. Some conventional vehicles, having floors running continuously over the axles and positioned to conveniently receive cargo at warehouse dock level, offer limited side access through doors penetrating the side walls, but the structural integrity of such vehicles may be drastically reduced. Moreover, to make use of such side doors, drivers may be required to climb a ladder from street level up to the side door, bend over into the interior of the vehicle to reach the cargo, and then descend the ladder while carrying heavy cargo. Such an arrangement presents a significant risk of injury or exhaustion of the vehicle's driver.

Another potential disadvantage of conventional, structural side walls is that insulating foam for heated or refrigerated storage compartments must be inserted between the rigid, thermally conductive steel or aluminum framing in the walls, thereby permitting thermal "leaks" in the side walls. Therefore, it is desirable to minimize or eliminate the structural requirements of the side walls of the delivery vehicle to afford side access to the cargo and to permit the use of non-structural, lightweight pre-fabricated insulating panels placed external to all framing.

Moreover, the load-bearing floor is typically required to be quite thick for adequate structural support. Because the ground clearance for such trailers is often fixed by regulation, a thick floor decreases the interior space available for storage. Therefore, it is also desirable to minimize or eliminate the load-bearing requirements of the floor of the delivery vehicle in order to maximize interior storage space, especially space located in the ergonomically advantageous lower zone of the trailer, accessible to a loader or unloader standing at the street level.

Accordingly, it is an object of the present invention to provide multi-tier cargo storage in a delivery vehicle.

It is a further object of the invention to provide a multi-tier delivery vehicle which can be both loaded and unloaded from a single, selectable storage tier.

A still further object of the invention is to provide a multi-tier delivery vehicle which can be loaded at a first storage tier and unloaded at a second, different storage tier.

A still further object of the invention is to provide a multi-tier delivery vehicle which can be loaded from the rear and unloaded from either side or, conversely, can be loaded from either side and unloaded from the rear.

A still further object of the invention is to provide a multi-tier delivery vehicle which can be loaded from the rear at a first storage tier and unloaded from the side at a second, different storage tier.

A still further object of the invention is to provide a multi-tier delivery vehicle that can be unloaded at street level by the driver or his assistant without subjecting them to undue strain or injury.

A still further object of the invention is to provide a multi-tier delivery vehicle in which the load-bearing requirements placed on the side walls and floors is substantially reduced, permitting greater side access to the cargo, allowing the use of inexpensive and readily available insulating panels to form a continuous thermal barrier in the side walls, and maximizing internal storage space.

SUMMARY OF THE INVENTION

The invention provides improved loading and unloading capability for cargo delivery vehicles such as double drop trailers. According to one aspect of the invention, there is provided a transport vehicle having at least an upper and a lower storage tier and an elevator assembly having at least an upper and a lower cargo platform in vertical alignment. The platforms are raised and lowered between a first position in which the lower platform accepts or delivers cargo positioned at the upper storage tier; a second position in which the lower platform is descended to the lower storage tier and the upper platform accepts or delivers cargo positioned at the upper storage tier; and a third position in which the upper platform is descended to accept or deliver cargo positioned at the lower storage tier.

According to a second aspect of the invention, there is provided a transport vehicle having a plurality of adjoining elevator assemblies of the type described, the upper platforms forming a segmented upper platform when in horizontal alignment, and the lower platforms forming a segmented lower platform when in horizontal alignment. The elevator assemblies may operate independently of each other to permit selective rearrangement of cargo between elevator assemblies and between upper and lower storage tiers. The platforms of each elevator assembly may move vertically within grooved guide rails at each platform corner.

According to a third aspect of the invention, there is provided a transport vehicle having a plurality of independently operable, adjoining elevator assemblies of the type described and one or more stationary platforms adjoining selected elevator assemblies. The stationary platforms may be fixed at a selected height so as to offer either upper or lower tier storage at points along the vehicle's length where multi-tier storage is not permitted, such as above the wheel wells or the fifth wheel of a truck.

According to a fourth aspect of the invention, there is provided a transport vehicle having a plurality of independently operable, adjoining elevator assemblies of the type described, each elevator assembly having platforms vertically movable within grooved guide rails suspended from lateral overhead beams resting on a deep center truss. The deep center truss extends substantially the entire length of the vehicle and transfers the weight of the cargo directly to the vehicle's axles, thereby permitting the use of a relatively thin, non-load bearing floor to maximize the internal vertical clearance available for cargo storage.

According to a fifth aspect of the invention, there is provided a transport vehicle having a plurality of independently operable, adjoining elevator assemblies of the type described, each elevator assembly having platforms vertically movable within grooved guide rails suspended from lateral overhead beams resting on a deep center truss. The deep center truss extends substantially the entire length of the vehicle and transfers the weight of the cargo directly to the vehicle's axles, thereby permitting the use of inexpensive, commercially available insulated panels to form the side walls of the vehicle and afford hot or cold storage throughout the vehicle. Side-access doors are provided at various low places in the vehicle side walls, permitting loading and unloading from curbside.

BRIEF DESCRIPTION OF THE FIGURES

The invention will be more clearly understood after reference to the following detailed specification read in conjunction with the drawings, wherein:

FIG. 1 is a cut-away perspective view of a multi-tier delivery vehicle generally showing adjoining elevator assemblies arranged in the vehicle's interior.

FIGS. 3a–h, when viewed seriatim, show a sequence wherein cargo is loaded into the upper storage tier and manipulated on the various elevator assemblies so that unloading occurs only from the lower storage tier.

FIG. 3a shows a first set of cargo loaded onto the upper storage tier.

FIG. 3b shows a first set of cargo lowered to the lower storage tier, which is nominally at street level.

FIG. 3c shows the vehicle loaded to capacity, wherein additional cargo has been loaded onto the upper storage tier above the first set of cargo.

FIG. 3d shows the first set of cargo having been unloaded at street level.

FIG. 3e shows cargo which had been loaded and transported in the upper storage tier now lowered to street level for unloading.

FIG. 3f shows a vehicle from which all cargo has been unloaded except the cargo loaded and transported over the wheel wells of the vehicle.

FIG. 3g shows cargo initially stored above the vehicle's wheel wells now moved into position on elevator platforms.

FIG. 3h shows cargo initially stored above the vehicle's wheel wells now lowered to street level for unloading.

FIG. 7 is an overhead plan view of an elevator assembly platform with cargo conveyor, load lock mechanism, and supporting guide rails.

FIG. 8 is an enlarged view of the guide rails of FIG. 7, showing the interlocking of sliding members supporting the upper and lower elevator platforms.

DETAILED DESCRIPTION OF THE PREFERRED EMBODIMENT

Figure 2C:
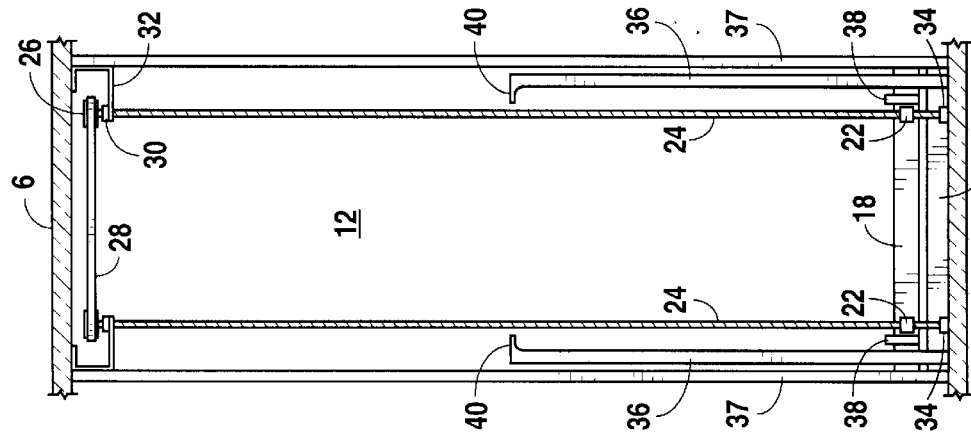
FIG. 2c is a side view of the elevator assembly of FIG. 2b lowered to permit unloading of cargo positioned at the lower tier from the upper platform.

In the preferred embodiment, the multi-tier delivery vehicle includes a plurality of independently operable, adjoining elevator assemblies with upper and lower platforms, as shown in FIG. 1. As shown in FIG. 3a, delivery vehicle 2 is preferably a double drop trailer with dropped areas 44a and 44b fore and aft of the vehicle's rear axle, respectively. Vehicle loading is accomplished primarily through upper-access rear doors 8a and 8b of FIG. 1, such as from a raised loading dock. Multiple elevator assemblies 12 are arranged in the vehicle's interior so as to provide continuous platforms extending the length of the vehicle for upper and lower tiers of cargo. Each elevator assembly includes vertically movable upper platform 14 and lower platform 16. Cargo is unloaded from vehicle 2 at curbside through lower-access side doors 10a and 10b. These side doors may be positioned just above vehicle floor 4 in dropped areas 44a and 44b, as shown in FIG. 3a. Side doors 10c and 10d provide access to storage space over wheel wells 48a and 48b, which may be used to store empty pallets, refrigeration equipment, etc. Insulated panels 6 form side walls, roof, and floor, and provide the capability to transport hot or cold cargo. A variety of such insulated panels is readily available from manufacturers such as Metal-Span Corp. in Lewisville, Tex., which provides Metal-Span III SL and SL-44 fluted wall panels having a polyurethane core.

Figure 2B:
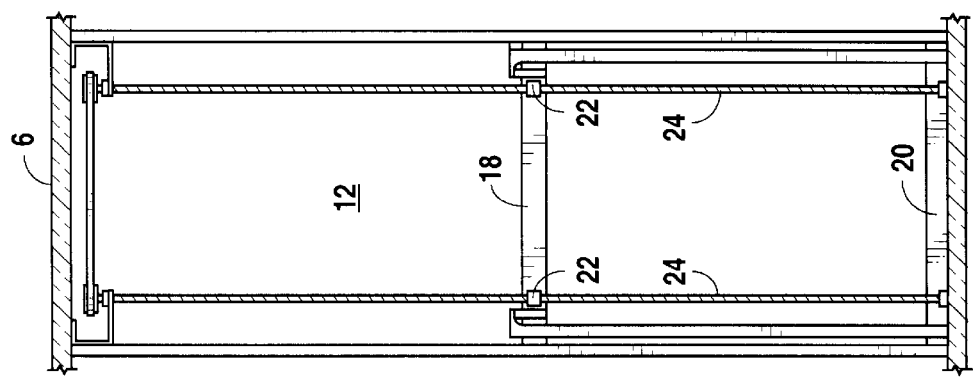
FIG. 2b is a side view of the elevator assembly of FIG. 2a lowered to an intermediate position for loading cargo positioned at the upper tier onto the upper platform, and for unloading cargo positioned at the lower tier from the lower platform.
Figure 2A:
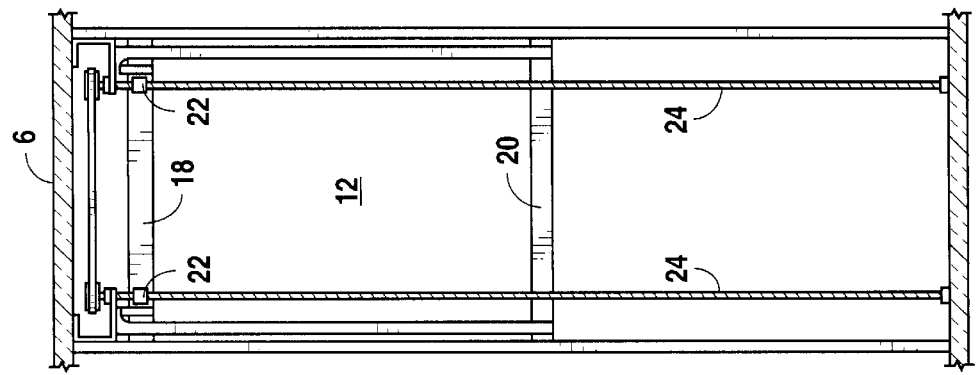
FIG. 2a is a side view of a single elevator assembly in a raised position for loading cargo positioned at the upper tier onto the lower platform.

Each individual elevator assembly is preferably operable independent of the other elevator assemblies. FIGS. 2a–c show the three principal positions of an elevator assembly in a two-tier configuration. A raised position is shown in FIG. 2a, wherein upper platform support rail 18 suspends an upper platform 14 (hidden from view). Lower platform support rail 20 suspends a lower platform 16 (hidden from view) at a height compatible with a raised loading dock from which cargo is to be loaded.

In a manner hereinafter described, upper and lower platform support rails 18 and 20, respectively, are lowered to an intermediate position shown in FIG. 2b. In this position, additional cargo may be loaded onto the upper platform 14 from a raised loading dock for transport in the upper tier of cargo, while the cargo previously loaded onto lower platform 16 occupies the lower cargo tier during transit. Upon arrival at the destination, the lower tier of cargo may be unloaded at street level. FIG. 2c shows the third, lower position wherein upper platform support rail 18 is lowered to floor level, thereby permitting unloading of the upper tier of cargo at street level.

The loading and unloading sequence can be more readily understood from FIGS. 3a–h. FIG. 3a shows first cargo pallets 41a, 41b, 41c, 41d, and 41e loaded onto lower platforms 16a, 16b, 16c, 16d, and 16e of multiple elevator assemblies 12a, 12b, 12c, 12d, and 12e. Stationary platforms 50a and 50b may be used over wheel wells 48a and 48b to join upper platforms of separated elevator assemblies where the interior height available for storage is insufficient to accommodate two tiers of cargo. FIG. 3b shows first cargo pallets 41a, 41b, 41c, 41d, and 41e lowered by elevator assemblies in the intermediate position shown in FIG. 2b. In FIG. 3c, second cargo pallets 42a, 42b, 42c, 42d, and 42e are loaded onto the upper platforms 14a, 14b, 14c, 14d, and 14e to form a second tier of cargo. Third cargo pallets 43a, 43b, and 43c may also be loaded onto stationary platforms 50a and 50b. In FIG. 3d, first cargo pallets 41a, 41b, 41c, 41d, and 41e have been unloaded at curbside from lower platforms 16a, 16b, 16c, 16d, and 16e, while the elevator assemblies remain in the intermediate position shown in FIG. 2b. Next, the elevator assemblies are lowered into the lower position shown in FIG. 2c to permit unloading of second cargo pallets 42a, 42b, 42c, 42d, and 42e from upper platforms 14a, 14b, 14c, 14d, and 14e, as shown in FIGS. 3e and 3f. If cargo is transported on stationary platforms 50a and 50b, they are unloaded by returning the elevator assemblies to their intermediate positions and pushing third cargo pallets 43a, 43b, and 43c onto upper platforms 14a, 14b, and 14e, as shown in FIG. 3g. Elevator assemblies 12a, 12b, 12c, 12d, and 12e are then returned to their lower positions to permit unloading of third cargo pallets 43a, 43b, and 43c at street level, as shown in FIG. 3h.

It will be readily understood that the foregoing sequence can be reversed so that loading is accomplished at the lower cargo tier and unloading is accomplished at the upper cargo tier. Moreover, it will be apparent that all loading and unloading can be performed only through upper-access rear doors 8a and 8b, or only through lower-access side doors 10a and 10b. Also, it can be seen that loading and unloading can be performed at different tiers with only rear access. Likewise, it is readily apparent that loading and unloading can be performed at different tiers with only side access. In summary, any combination of (i) rear or side access and (ii) upper tier or lower tier access is permitted for both loading and unloading cargo.

Figure 4:
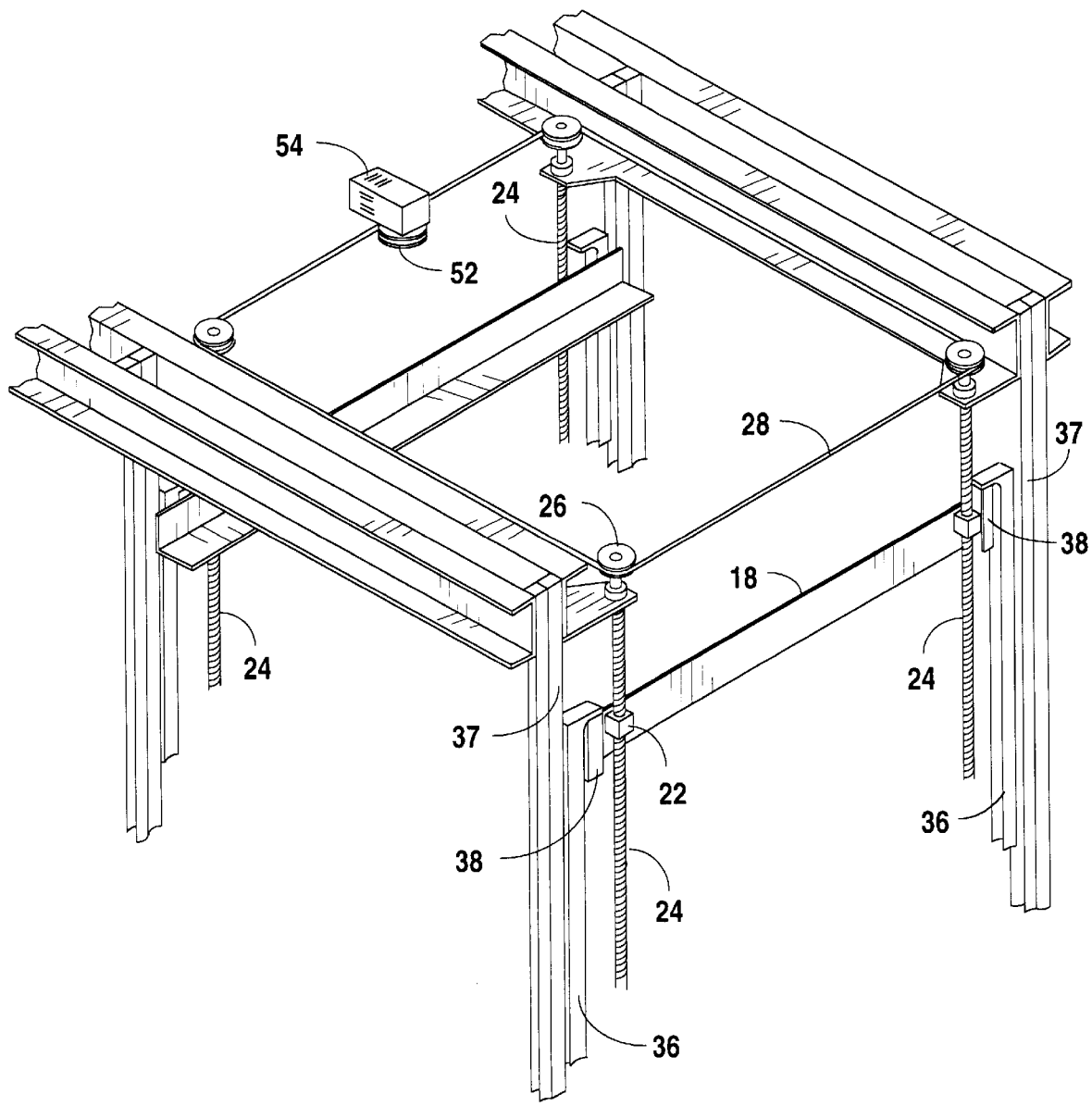
FIG. 4 is a perspective view of a drive mechanism for a single elevator assembly.

The operation of each dual-platform elevator assembly 12 is shown generally in FIGS. 2a–c. Upper platform support rail 18 is suspended from threaded rods 24 by lifting nuts 22. Lifting nuts 22 are caused to travel up and down threaded rods 24 by the rotation of cogged pulleys 26 fixed atop each threaded rod. The lower end of each rotating threaded rod is contained in a ball bearing 34. Each elevator assembly includes four threaded rods and four cogged pulleys, the pulleys being driven by a single cogged belt 28, as shown in FIG. 4. The cogged belt is preferably made of rubber and is driven by motor 54. The weight of the cargo is transferred from upper platform support rail 18 to threaded rods 24 in tension via lifting nuts 22, and is further transferred to bearing support plates 32. Tapered roller bearings 30 atop each bearing support plate 32 permit rotation of weight bearing threaded rods 24.

Figure 5:
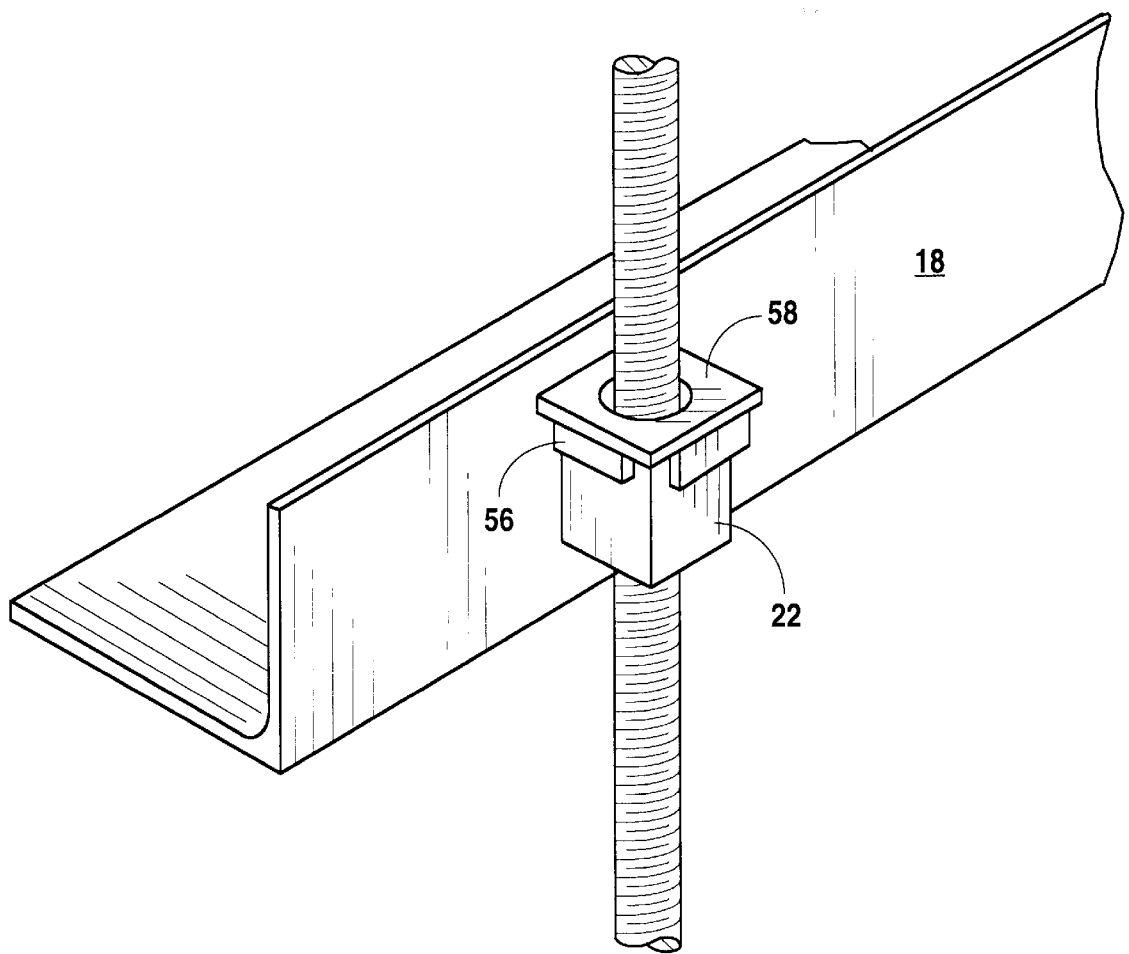
FIG. 5 is a detailed perspective view of a threaded rod arrangement for raising and lowering the platforms of an elevator assembly.

As previously described, the platforms are lifted by an arrangement consisting primarily of rotating threaded rods 24 engaging lifting nuts 22. As shown in FIG. 5, each threaded nut 22 engages a lifting flange 58, which is preferably welded to upper platform support rail 18. A nut retainer 56 may be attached beneath flange 58 to prevent lifting nut 22. Those skilled in the art will recognize that other lifts, such as hydraulic or pneumatic cylinders or gear and cable lifts, could also be used.

Each elevator assembly 12 also includes four sets of guide rails which constrain the lateral movement of the upper and lower platforms and permit them to move in the vertical relationship with each other shown in FIGS. 2a–c. In the lowered position shown in FIG. 2c, upper platform support rail 18 can be raised independently of lower platform support rail 20. As the upper platform approaches the intermediate position shown in FIG. 2b, upper platform carriage 38 engages flange 40 of sliding guide rail 36, the lower end of which is affixed to lower platform support rail 20. As the threaded rods 34 continue to rotate, both platforms are then raised together until the upper position shown in FIG. 2a is reached.

The upper platform carriage 38, sliding guide rail 36, and stationary guide rail 37 are shown in perspective in FIG. 4, and are shown in a top view in FIG. 8. Lateral movement of upper platform carriage 38 (and hence the upper platform) is constrained by its interlocking with sliding guide rail 36 via T-shaped rail insert 61, which is preferably made of polyethylene. Sliding guide rail 36 is in turn constrained to move only vertically by the interlocking of T-shaped rail insert 62 with stationary guide rail 37. Additional rail inserts attached to sliding guide rail 36 near the lower platform support rail slidingly interlock with stationary guide rail 37, limiting lateral movement at the bottom of the cargo stack.

It will be readily apparent that the elevator assemblies described can be extended to three, four, or more platforms so as to provide more than two tiers of storage. The dual-platform version described and illustrated would be commonly employed for palletized cargo from four to six feet in height, where vehicle height restrictions permit the use of no more than two tiers of cargo. However, other types of cargo, such as recyclables to be transported in shorter bins, may permit the use of several storage tiers.

Figure 6:
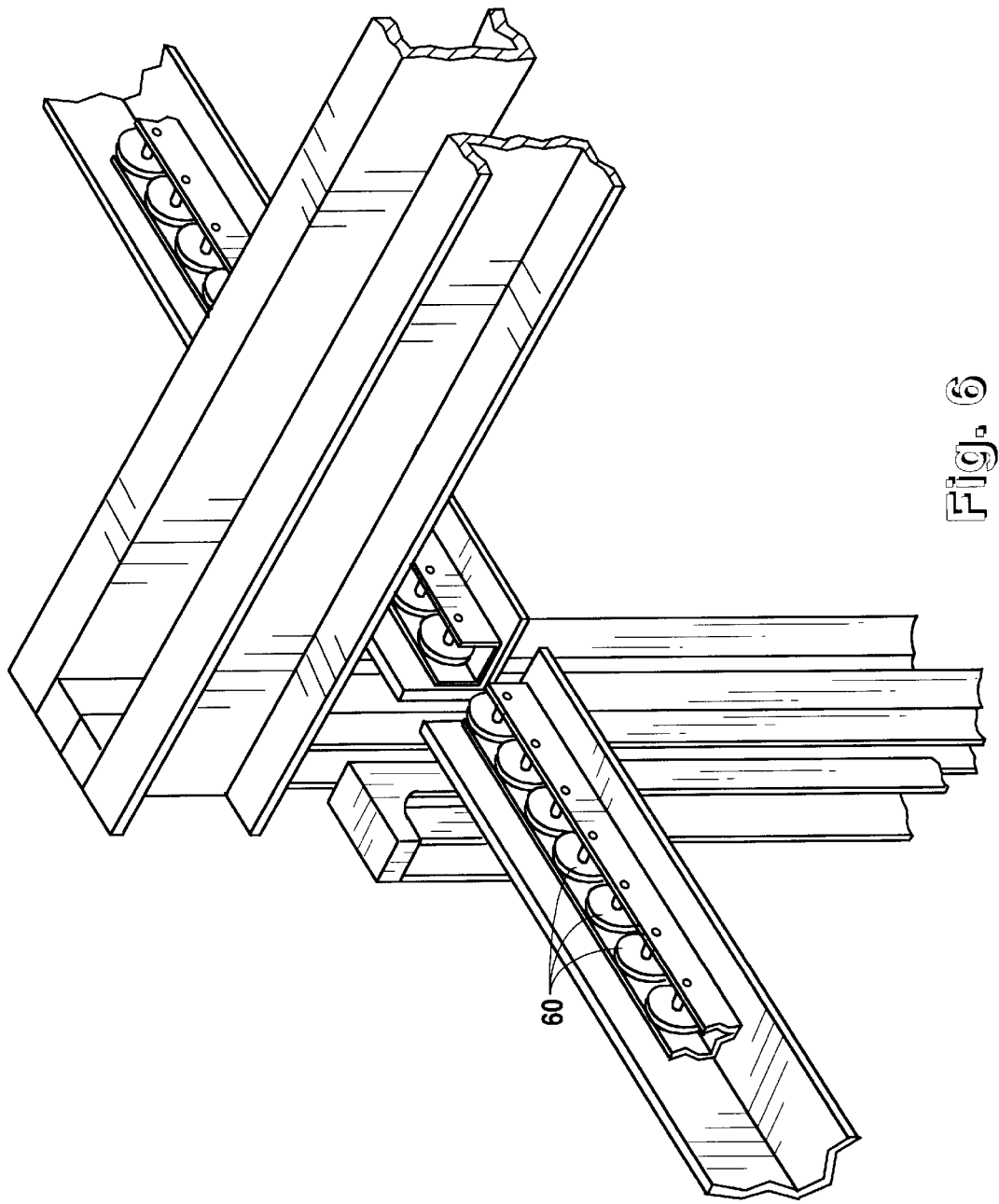
FIG. 6 is a perspective view of a conveyor spanning elevator assemblies for easily moving cargo between elevator assemblies, either fore or aft, in the vehicle.

In the preferred embodiment, upper and lower platforms 14 and 16, respectively, may be provided with a conveyor mechanism to facilitate the movement of cargo fore and aft between elevator assemblies. Where the cargo is loaded on wooden or metal pallets, conveyor wheels 60 may be employed, as shown in FIG. 6. Preferably, conveyor wheels 60 are mounted in upper and lower platforms support rails 18 and 20. Other conveyors, such as belts, may readily be substituted. As shown in FIG. 7, platform decking 64 may be employed, which is preferably suitable for walking on by personnel responsible for pushing cargo into the vehicle or pulling it out. In the case of wheeled cargo or wheeled cargo containers, an integral conveyor may be omitted in favor of solid decking.

Figure 9:
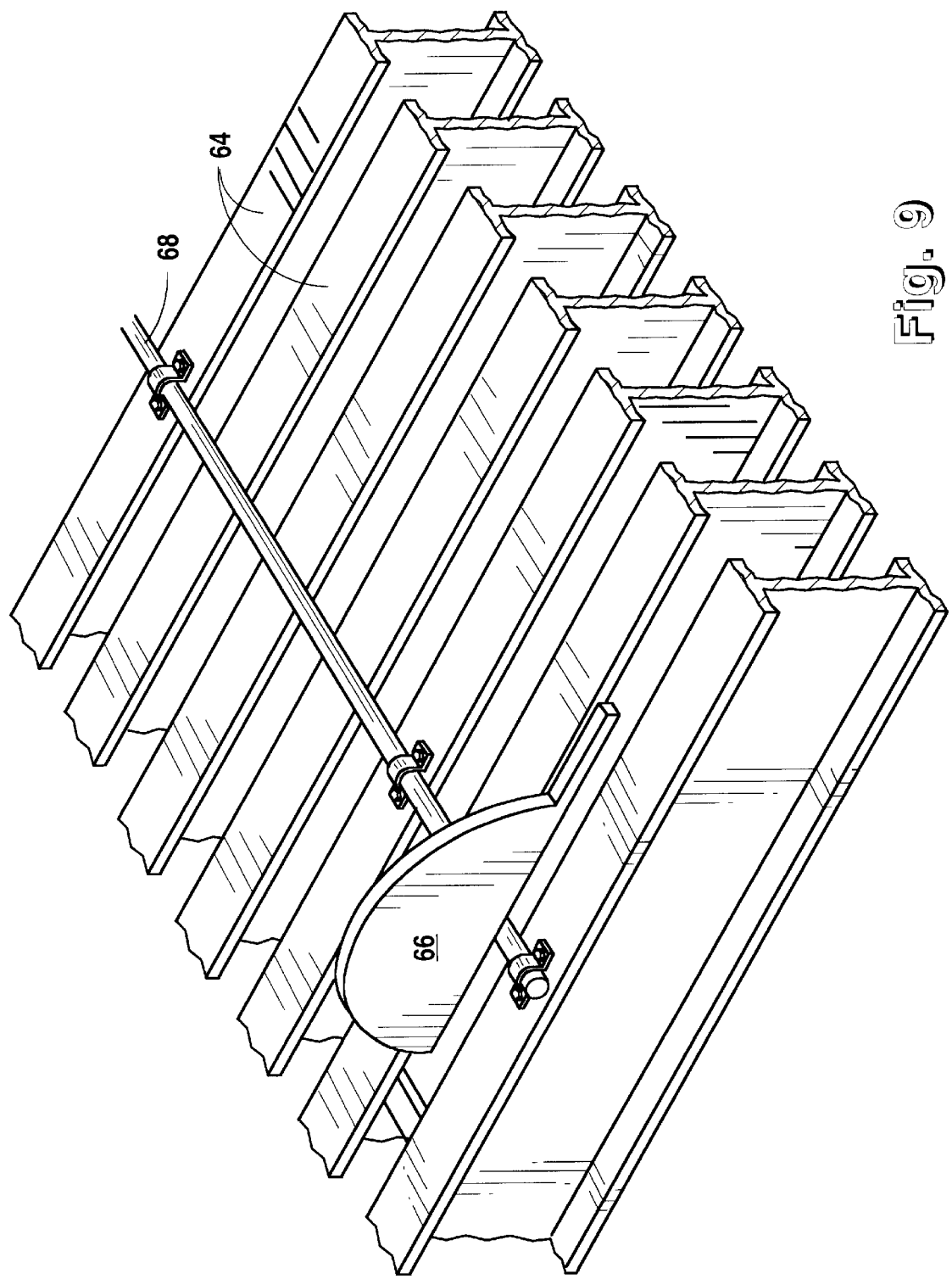
FIG. 9 is a perspective view of a load locking mechanism which prevents movement fore and aft of the loaded cargo.

The preferred embodiment also includes a load locking mechanism for locking cargo into place and preventing its movement fore and aft on the conveyor. FIG. 7 is a top view showing load locks 66, which are cooperatively coupled by load lock shaft 68. The load lock 66 is preferably a half-moon shape which, upon rotation of load lock shaft 68, is selectively activated or deactivated by rotation above or below platform decking 64, respectively, as shown in FIG. 9. Pillow block bearings 70 (FIG. 7) are employed to isolate load lock shaft 68 from transverse forces.

Figure 10:
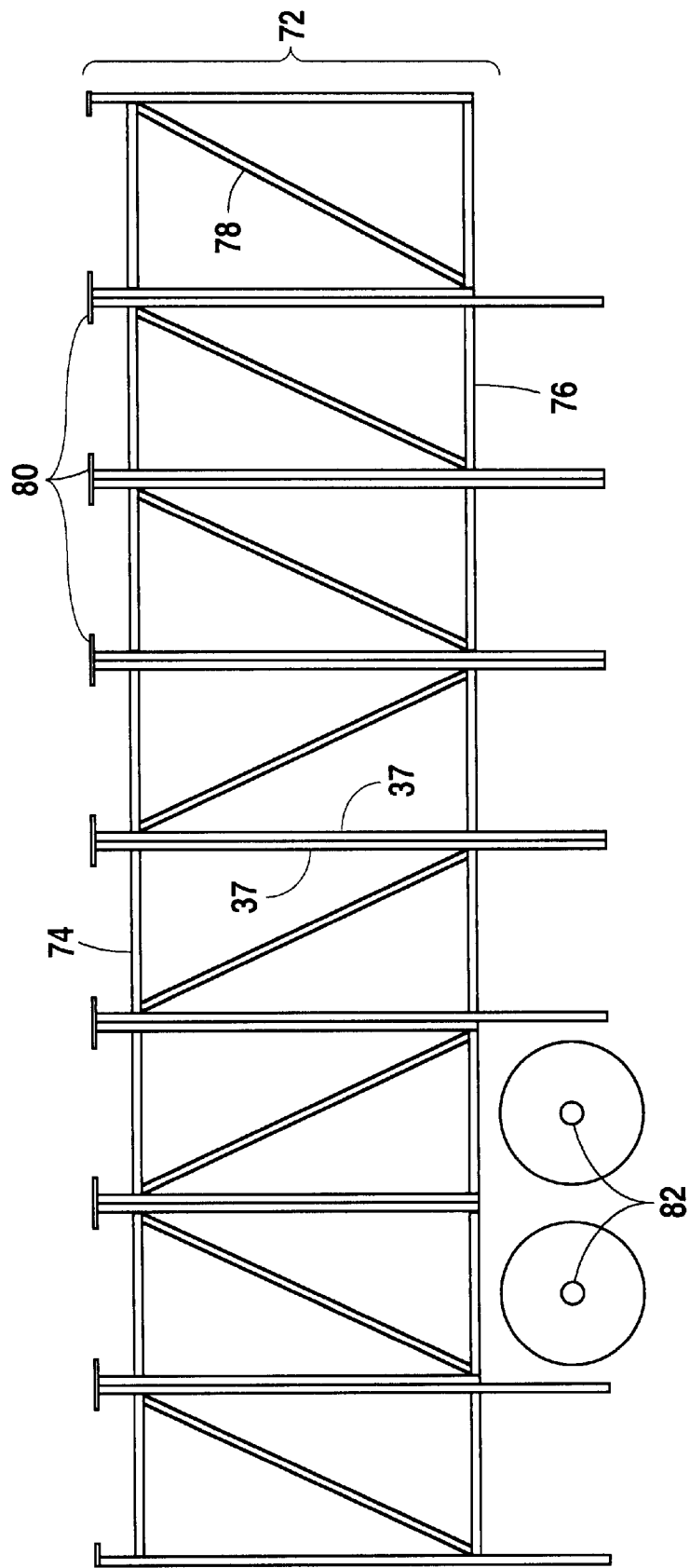
FIG. 10 is a side view of a deep center truss from which the elevator assemblies and their associated cargo are suspended.
Figure 11:
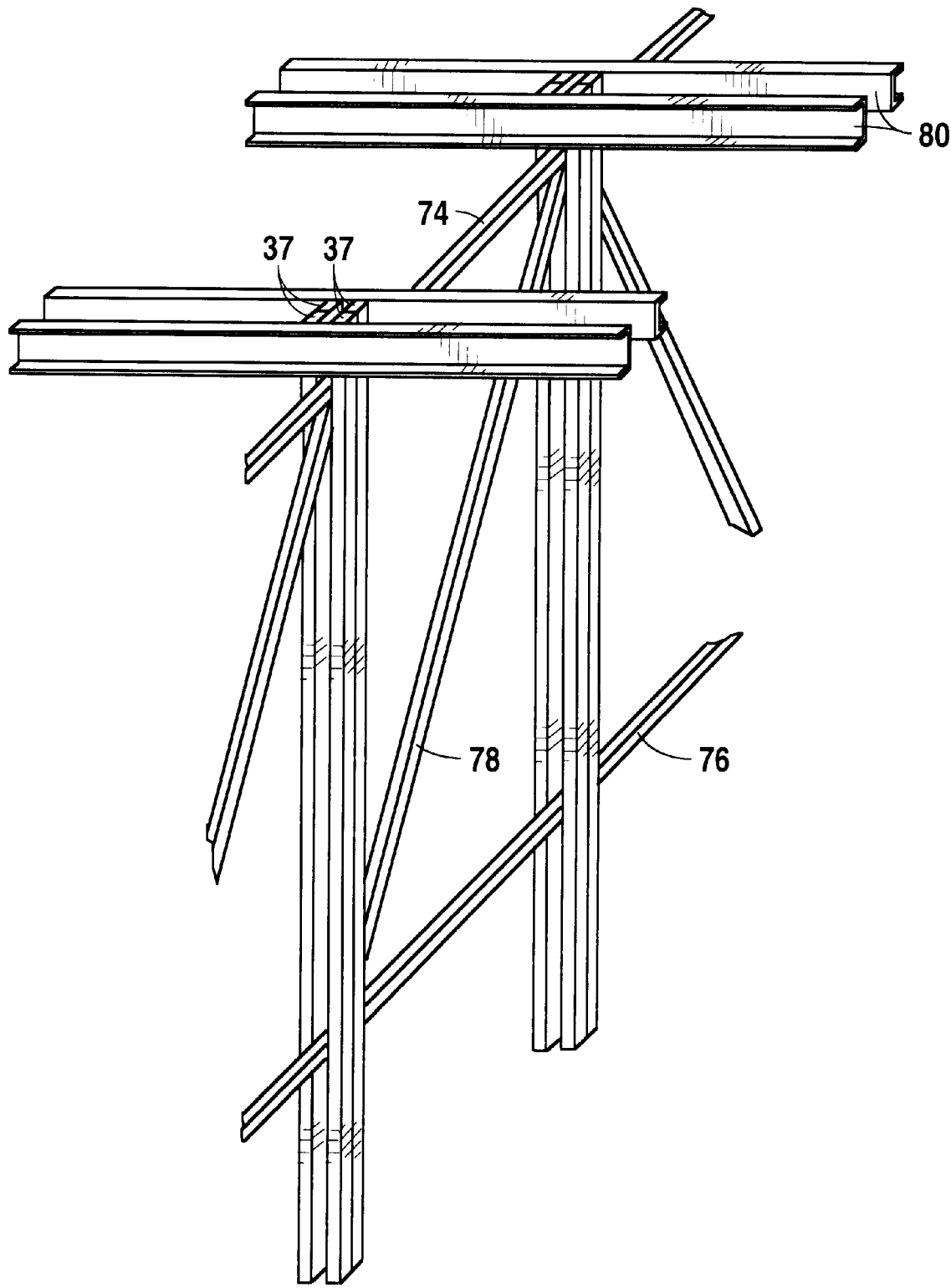
FIG. 11 is a perspective view of a deep center truss whose vertical members are formed by the guide rails of elevator assemblies.

Referring now to FIG. 10, a deep center truss 72 is provided so as to transfer the cargo weight directly to the axles 82 of the delivery vehicle, thereby permitting the use of a non-structural vehicle floor 4 (FIG. 1) and continuous, non-structural insulated panels 6 in the side walls of the vehicle. There is preferably one row of elevator assemblies 12 on either side of the deep center truss 72 (FIG. 10). The vertical members of the deep center truss 72 comprise the innermost stationary rails 37 of the various elevator assemblies 12. The outermost stationary rails 37 of each elevator assembly are connected to transverse roof beams 80 (FIGS. 10 and 11), which completes the transfer of cargo weight to the deep center truss 72. Other structural truss members are top chords 74, bottom chords 76, and truss diagonals 78, shown from the side in FIG. 10 and in perspective in FIG. 11. The deep center truss 72 is necessarily the full interior height of the vehicle in order to utilize the stationary rails 37 as compressive vertical members of the truss. The resulting large vertical distance separating the top chord 74 from the bottom chord 76 greatly reduces the structural forces in the top and bottom chords and hence reduces the cross-sectional area and weight required of these members to handle the loads. The clusters of four inner stationary guide rails 37 acting together as a column at the intersection of four elevator mechanisms provide an excellent structural configuration with lateral stability for supporting the roof beam loads.

While a particular embodiment of the invention has been illustrated and described, it will be obvious to those skilled in the art that various changes and modifications may be made without sacrificing the advantages provided by the principle of construction disclosed herein.

Having described our invention, we claim:

1. A delivery vehicle with multi-tier cargo storage, comprising:
   a plurality of independently operable elevator assemblies disposed in said vehicle for raising and lowering cargo between different storage tiers, each of said elevator assemblies comprising:
   a lower cargo platform movable between an intermediate position and a lowered position;
   an upper cargo platform positioned above the lower cargo platform and vertically movable relative thereto, said upper cargo platform being movable between a raised position and a lowered position, said raised position being higher than the intermediate position occupied by the lower cargo platform;
   a lift for raising and lowering the lower cargo platform and upper cargo platform to permit the loading and unloading of cargo;
   means for limiting the vertical relative movement between the lower cargo platform and the upper cargo platform as they are raised; and
   cargo access means in at least one side of the delivery vehicle, said access means being positioned so as to permit cargo loading and unloading at the lower cargo platform of at least one of said plurality of elevator assemblies when said lower cargo platform is in its lowered position.

2. The delivery vehicle of claim 1, wherein each of said plurality of elevator assemblies further comprises stabilizing means for preventing the movement of the upper cargo platform and the lower cargo platform from side to side.

3. The delivery vehicle of claim 2, wherein the stabilizing means is spaced apart to permit cargo access from the side of the delivery vehicle.

4. The delivery vehicle of claim 1, wherein the lift comprises a nut mounted to said upper cargo platform and operatively coupled to a rotating, threaded rod.

5. The delivery vehicle of claim 1, wherein the lift comprises a supporting member mounted to said lower cargo platform and suspended from said upper cargo platform for raising the lower cargo platform as the upper cargo platform is raised.

6. The delivery vehicle of claim 5, wherein the limiting means comprises a flange atop the supporting member for engaging the upper cargo platform as the upper cargo platform is raised to a point proximate the intermediate position.

7. The delivery vehicle of claim 5, wherein the upper cargo platform is slidably mounted to the supporting member.

8. The delivery vehicle of claim 7, wherein each of said plurality of elevator assemblies further comprises stabilizing means for preventing the movement of the upper cargo platform and the lower cargo platform from side to side, said supporting member being slidably mounted to the stabilizing means.

9. A delivery vehicle with multi-tier cargo storage, comprising:
  an elevator assembly for raising and lowering cargo between different storage tiers, said elevator assembly comprising:
    a lower cargo platform movable between an intermediate position and a lowered position;
    an upper cargo platform positioned above the lower cargo platform and vertically movable relative thereto, said upper cargo platform being movable between a raised position and a lowered position, said raised position being higher than the intermediate position occupied by the lower cargo platform;
    a lift for raising and lowering the lower cargo platform and upper cargo platform to permit the loading and unloading of cargo; and
    means for limiting the vertical relative movement between the lower cargo platform and the upper cargo platform as they are raised; and
  support means coupled to and extending vertically alongside said elevator assembly for transferring substantially all cargo weight from the elevator assembly directly to an axle of the delivery vehicle.

10. The delivery vehicle of claim 9 wherein the support means comprises a truss extending substantially along the vehicle's length.

11. The delivery vehicle of claim 10, further comprising stabilizing means for preventing the movement of the upper cargo platform and the lower cargo platform from side to side.

12. The delivery vehicle of claim 11 wherein the stabilizing means is formed integrally with the truss.

13. The delivery vehicle of claim 11, wherein the stabilizing means is spaced apart to permit cargo access from the side of the delivery vehicle.

14. The delivery vehicle of claim 9 or 10, wherein the lift comprises a nut mounted to said upper cargo platform and operatively coupled to a rotating, threaded rod.

15. The delivery vehicle of claim 9 or 10, wherein the lift comprises a supporting member mounted to said lower cargo platform and suspended from said upper cargo platform for raising the lower cargo platform as the upper cargo platform is raised.

16. The delivery vehicle of claim 15, wherein the limiting means comprises a flange atop the supporting member for engaging the upper cargo platform as the upper cargo platform is raised to a point proximate the intermediate position.

17. The delivery vehicle of claim 15, wherein the upper cargo platform is slidably mounted to the supporting member.

18. The delivery vehicle of claim 16, further comprising stabilizing means for preventing the movement of the upper cargo platform and the lower cargo platform from side to side, said supporting member being slidably mounted to the stabilizing means.

19. A delivery vehicle with multi-tier cargo storage, comprising:
  an elevator assembly for raising and lowering cargo between different storage tiers, said elevator assembly comprising:
    a lower cargo platform movable between an intermediate position and a lowered position;
    an upper cargo plafform positioned above the lower cargo platform and vertically movable relative thereto, said upper cargo platform being movable between a raised position and a lowered position, said raised position being higher than the intermediate position occupied by the lower cargo platform;
    a lift for raising and lowering the lower cargo platform and upper cargo platform to permit the loading and unloading of cargo; and
    means for limiting the vertical distance between the lower cargo platform and the upper cargo platform as they are raised;
  cargo access means in at least one side of the delivery vehicle to permit loading and unloading of cargo from the side of the delivery vehicle; and
  a truss coupled to and extending vertically alongside said elevator assembly for transferring substantially all cargo weight from the elevator assembly directly to an axle of the delivery vehicle.

20. The delivery vehicle of claim 19, further comprising stabilizing means for preventing the movement of the upper cargo platform and the lower cargo platform from side to side.

21. The delivery vehicle of claim 20 wherein the stabilizing means is formed integrally with the truss.

22. The delivery vehicle of claim 20, wherein the stabilizing means is spaced apart to permit cargo access from the side of the delivery vehicle.

23. The delivery vehicle of claim 19, wherein the lift comprises a nut mounted to said upper cargo platform and operatively coupled to a rotating, threaded rod.

24. The delivery vehicle of claim 19, wherein the lift comprises a supporting member mounted to said lower cargo platform and suspended from said upper cargo platform for raising the lower cargo platform as the upper cargo platform is raised.

25. The delivery vehicle of claim 24, wherein the limiting means comprises a flange atop the supporting member for engaging the upper cargo platform as the upper cargo platform is raised to a point proximate the intermediate position.

26. The delivery vehicle of claim 24, wherein the upper cargo platform is slidably mounted to the supporting member.

27. The delivery vehicle of claim 26, further comprising stabilizing means for preventing the movement of the upper cargo platform and the lower cargo platform from side to side said supporting member being slidably mounted to the stabilizing means.

28. A delivery vehicle with multi-tier cargo storage, comprising:
  an elevator assembly for raising and lowering cargo between different storage tiers, said elevator assembly comprising:

a lower cargo platform movable between an intermediate position and a lowered position;

an upper cargo platform positioned above the lower cargo platform and vertically movable relative thereto, said upper cargo platform being movable between a raised position and a lowered position, said raised position being higher than the intermediate position occupied by the lower cargo platform;

a lift for raising and lowering the lower cargo platform and upper cargo platform to permit the loading and unloading of cargo; and means for limiting the vertical distance between the lower cargo platform and the upper cargo platform as they are raised;

cargo access means in at least one side of the delivery vehicle to permit loading and unloading of cargo from the side of the delivery vehicle;

a truss coupled to and extending vertically alongside said elevator assembly for transferring substantially all cargo weight from the elevator assembly directly to an axle of the delivery vehicle; and stabilizing means for preventing the movement of the upper cargo platform and the lower cargo platform from side to side, said stabilizing means being formed integrally with the truss and spaced apart to permit cargo access from the side of the delivery vehicle.

29. The delivery vehicle of claim 28, wherein the lift comprises a nut mounted to said upper cargo platform and operatively coupled to a rotating, threaded rod.

30. The delivery vehicle of claim 28, wherein the lift comprises a supporting member mounted to said lower cargo platform and suspended from said upper cargo platform for raising the lower cargo platform as the upper cargo platform is raised.

31. The delivery vehicle of claim 30, wherein the limiting means comprises a flange atop the supporting member for engaging the upper cargo platform as the upper cargo platform is raised to a point proximate the intermediate position.

32. The delivery vehicle of claim 30, wherein the upper cargo platform is slidably mounted to the supporting member.

33. The delivery vehicle of claim 32, wherein the supporting member is slidably mounted to the stabilizing means.

34. A delivery vehicle with multi-tier cargo storage, comprising:

an elevator assembly for raising and lowering cargo between different storage tiers, said elevator assembly comprising:

a lower cargo platform movable between an intermediate position and a lowered position;

an upper cargo platform positioned above the lower cargo platform and vertically movable relative thereto, said upper cargo platform being movable between a raised position and a lowered position, said raised position being higher than the intermediate position occupied by the lower cargo platform;

a nut mounted to said upper cargo platform and operatively coupled to a rotating, threaded rod;

a supporting member mounted to said lower cargo platform and suspended from said upper cargo platform for raising the lower cargo platform as the upper cargo platform is raised; and a flange atop the supporting member for engaging the upper cargo platform as the upper cargo platform is raised to a point proximate the intermediate position and limiting the vertical distance between the lower cargo platform and the upper cargo platform as they are raised;

cargo access means in at least one side of the delivery vehicle to permit loading and unloading of cargo from the side of the delivery vehicle; a truss coupled to and extending vertically alongside said elevator assembly for transferring substantially all cargo weight from the elevator assembly directly to an axle of the delivery vehicle; and stabilizing means for preventing the movement of the upper cargo platform and the lower cargo platform from side to side, said stabilizing means being formed integrally with the truss and spaced apart to permit cargo access from the side of the delivery vehicle.

35. The delivery vehicle of claim 34, wherein the upper cargo platform is slidably mounted to the supporting member and the supporting member is slidably mounted to the stabilizing means.

36. A method of loading and delivering cargo in a multi-tier storage delivery vehicle, comprising the steps of:

loading a first cargo portion on a lowermost cargo platform elevated to an intermediate position;

lowering the lowermost cargo platform with a lift;

loading a second cargo portion on an uppermost cargo platform positioned above the lowermost cargo platform;

unloading the first cargo portion from the lowermost cargo platform;

lowering the uppermost cargo platform relatively closer to the lowermost cargo platform with the lift; and unloading the second cargo portion from the uppermost cargo platform.

37. The method of claim 36, wherein the loading steps are performed through the rear of the delivery vehicle and the unloading steps are performed through at least one side of the delivery vehicle.

38. The method of claim 36, further comprising the step of preventing the movement of the uppermost cargo platform and the lowermost cargo platform from side to side with a stabilizing means.

39. The method of claim 36, wherein the lift comprises a nut mounted to said uppermost cargo platform and operatively coupled to a rotating, threaded rod.

40. The method of claim 36, wherein the lift comprises a supporting member mounted to said lowermost cargo platform and suspended from said uppermost cargo platform for raising the lowermost cargo platform as the uppermost cargo platform is raised.

41. The method of claim 40, wherein the uppermost cargo platform is slidably mounted to the supporting member.

42. A method of loading and delivering cargo in a multi-tier storage delivery vehicle, comprising the steps of:

loading a first cargo portion through the rear of the delivery vehicle and onto a lowermost cargo platform elevated to an intermediate position;

lowering the lowermost cargo platform with a lift;

loading a second cargo portion through the rear of the delivery vehicle and onto an uppermost cargo platform positioned above the lowermost cargo platform;

unloading the first cargo portion from the lowermost cargo platform through a side of the delivery vehicle;

lowering the uppermost cargo platform relatively closer to the lowermost cargo platform with the lift; and unloading the second cargo portion from the uppermost cargo platform through a side of the delivery vehicle.

43. A method of loading and delivering cargo in a multi-tier storage delivery vehicle, comprising the steps of:

loading a first cargo portion through a side of the delivery vehicle and onto an uppermost cargo platform positioned above a lowermost cargo platform and vertically movable relative thereto;

raising the uppermost cargo platform with a lift;

loading a second cargo portion through a side of the delivery vehicle and onto the lowermost cargo platform;

unloading the first cargo portion from the uppermost cargo platform through the rear of the delivery vehicle;

raising the lowermost cargo platform with the lift; and unloading the second cargo portion from the lowermost cargo platform through the rear of the delivery vehicle.

44. The method of claim 42 or 43, further comprising the step of preventing the movement of the uppermost cargo platform and the lowermost cargo platform from side to side with a stabilizing means.

45. The method of claim 42 or 43, wherein the lift comprises a nut mounted to said uppermost cargo platform and operatively coupled to a rotating, threaded rod.

46. The method of claim 42 or 43, wherein the lift comprises a supporting member mounted to said lowermost cargo platform and suspended from said uppermost cargo platform for raising the lowermost cargo platform as the uppermost cargo platform is raised.

47. The method of claim 46, wherein the uppermost cargo platform is slidably mounted to the supporting member.

* * * * *